Oct. 22, 1935.  V. FLAGIELLO  2,018,123
MACHINE FOR FINISHING ARMOR PLATE PIERCING SHELLS
Filed July 24, 1933    11 Sheets-Sheet 1
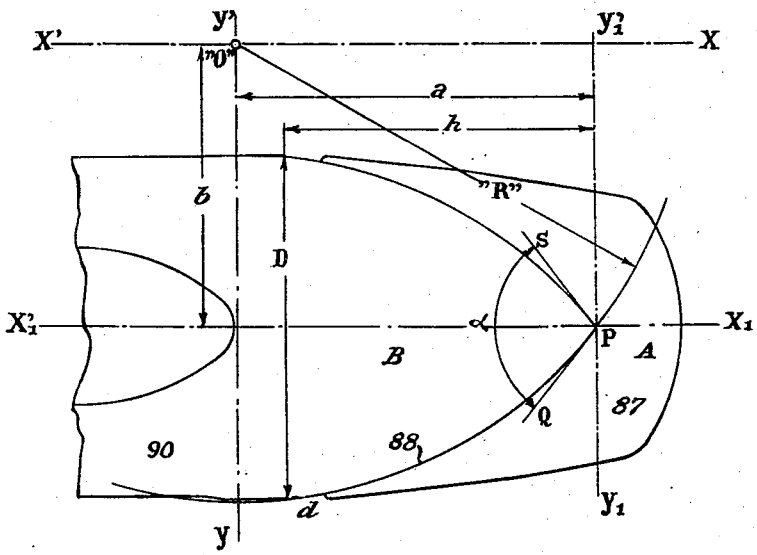
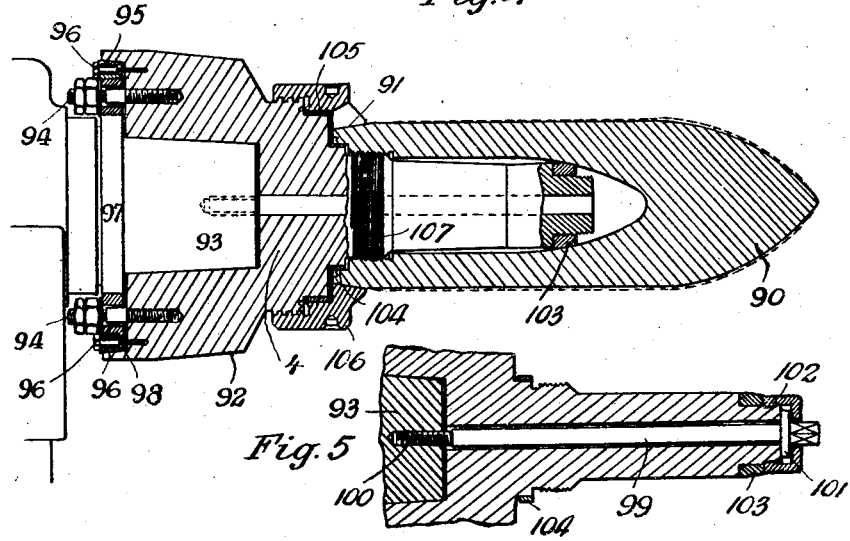
V. Flagiello
INVENTOR
By: Marks & Clark
Attys.

Oct. 22, 1935.  V. FLAGIELLO  2,018,123
MACHINE FOR FINISHING ARMOR PLATE PIERCING SHELLS
Filed July 24, 1933  11 Sheets-Sheet 2
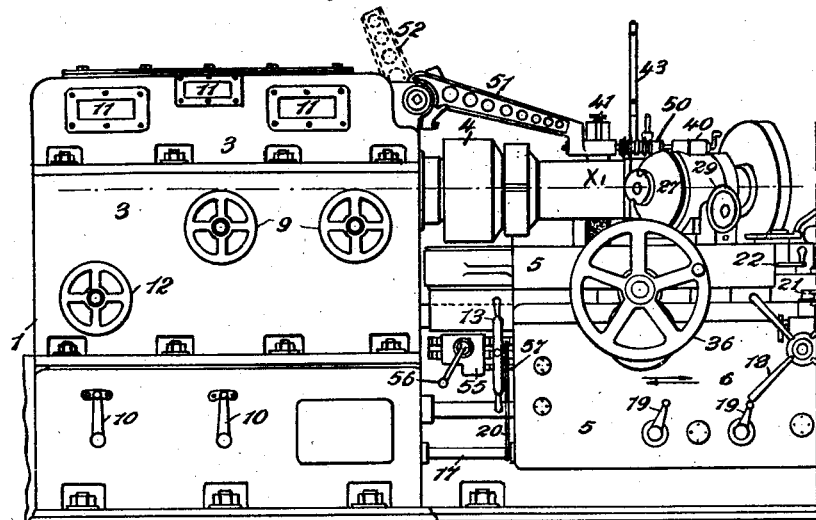
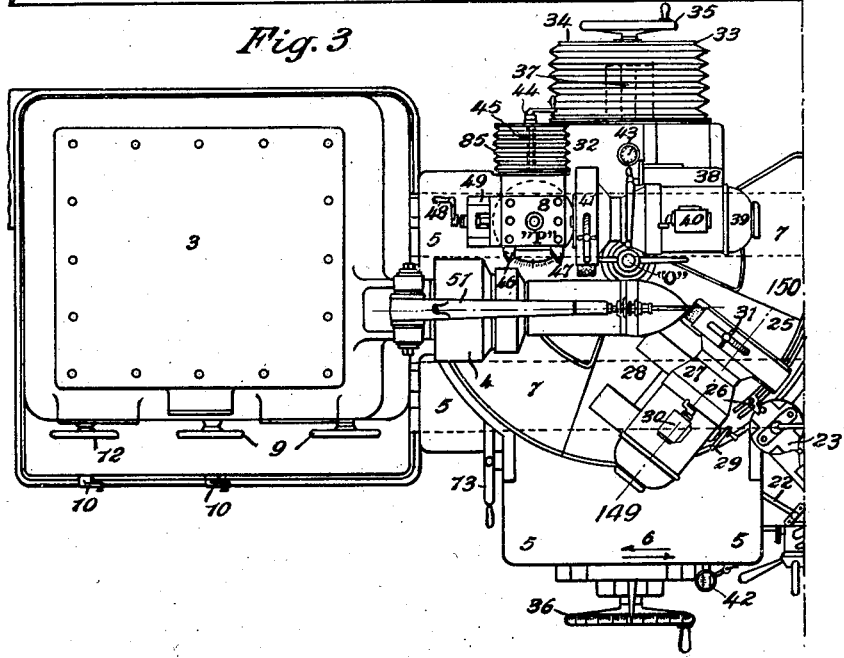
V. Flagiello
INVENTOR
By: Marks & Clark

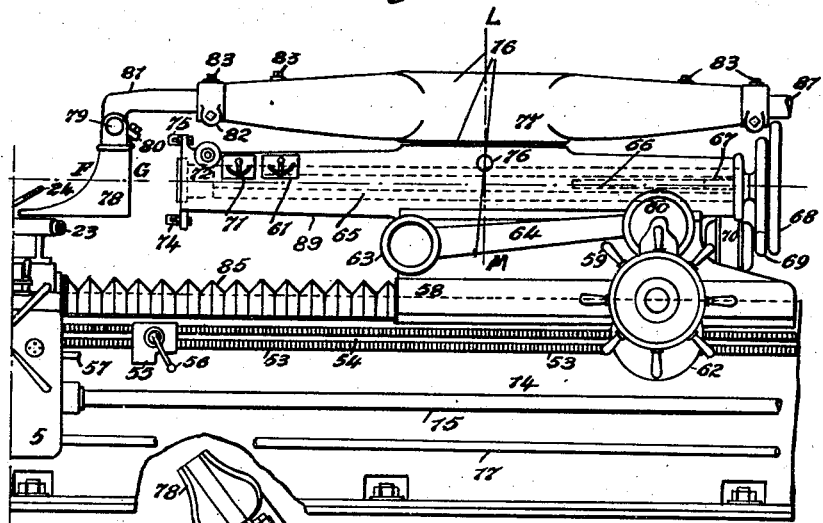

Oct. 22, 1935. V. FLAGIELLO 2,018,123
MACHINE FOR FINISHING ARMOR PLATE PIERCING SHELLS
Filed July 24, 1933 11 Sheets-Sheet 4
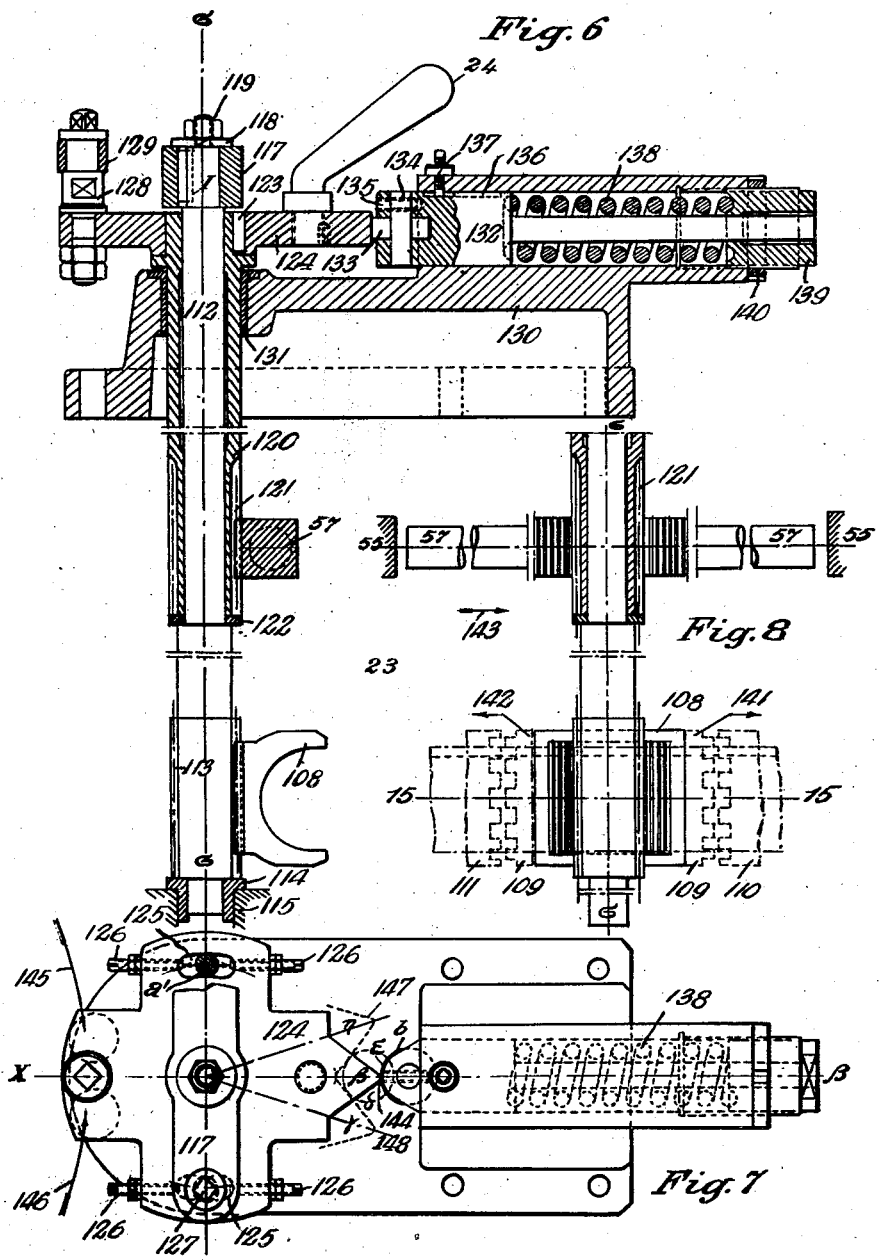

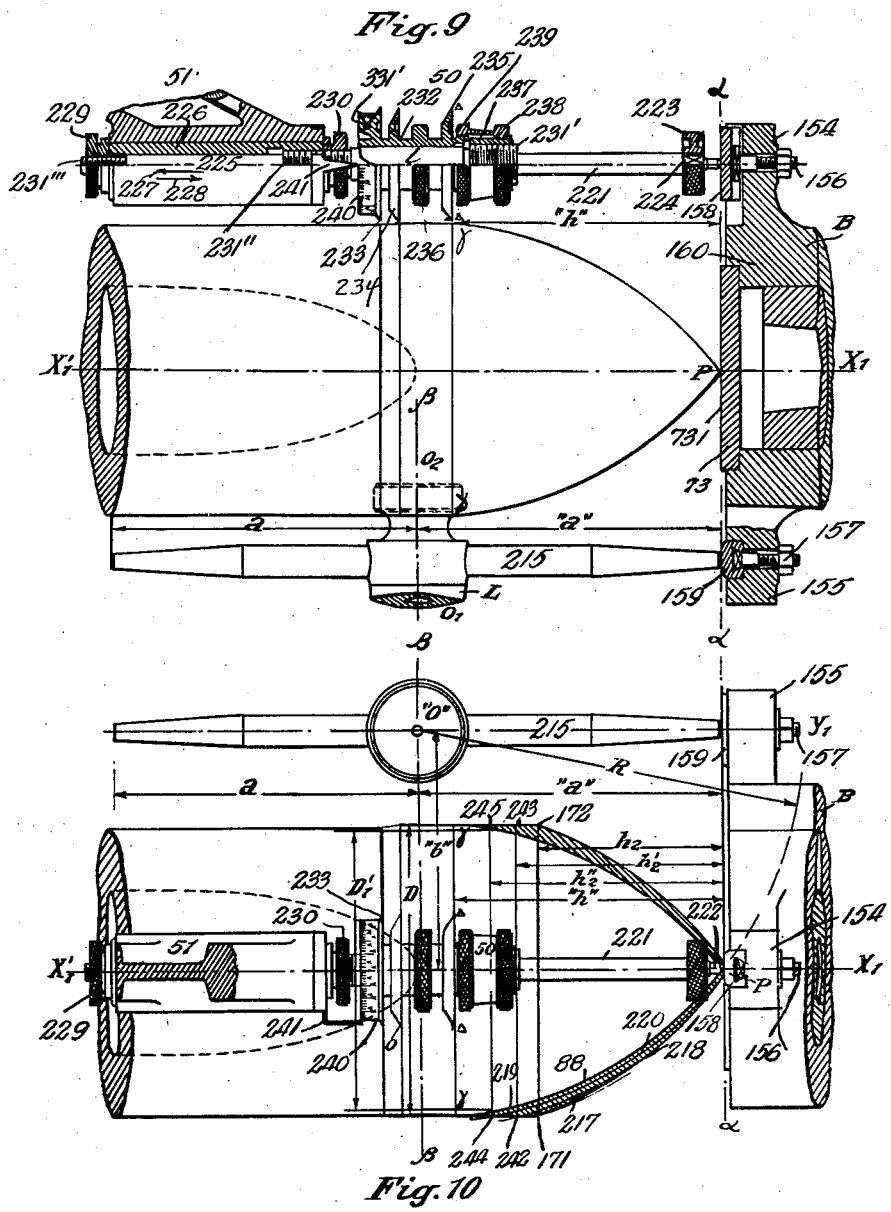

Oct. 22, 1935.  V. FLAGIELLO  2,018,123
MACHINE FOR FINISHING ARMOR PLATE PIERCING SHELLS
Filed July 24, 1933  11 Sheets-Sheet 6
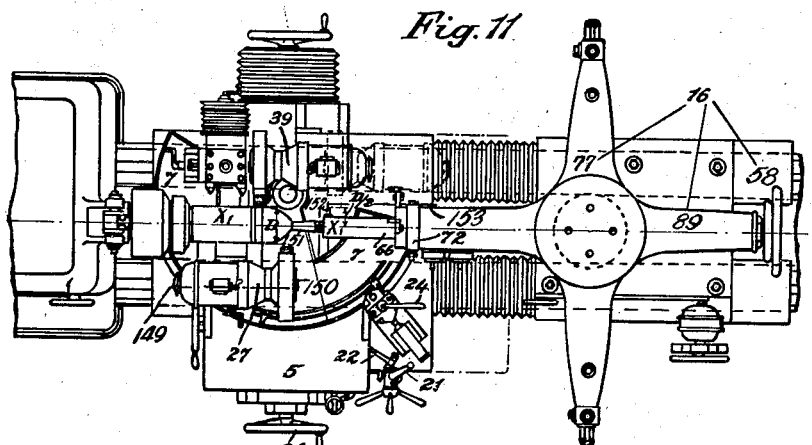
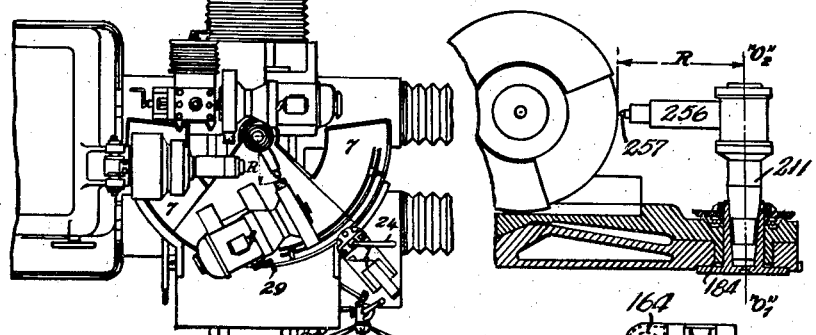
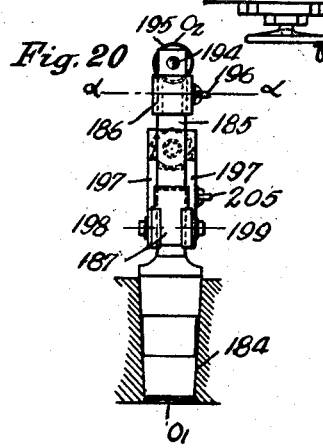
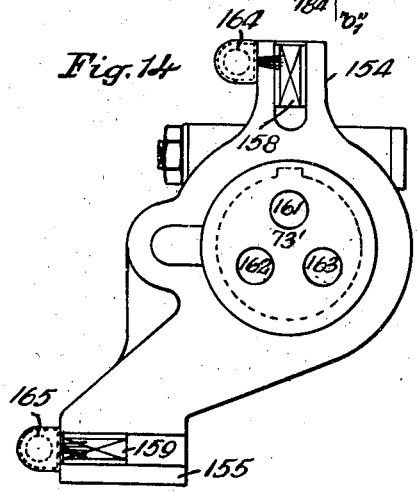

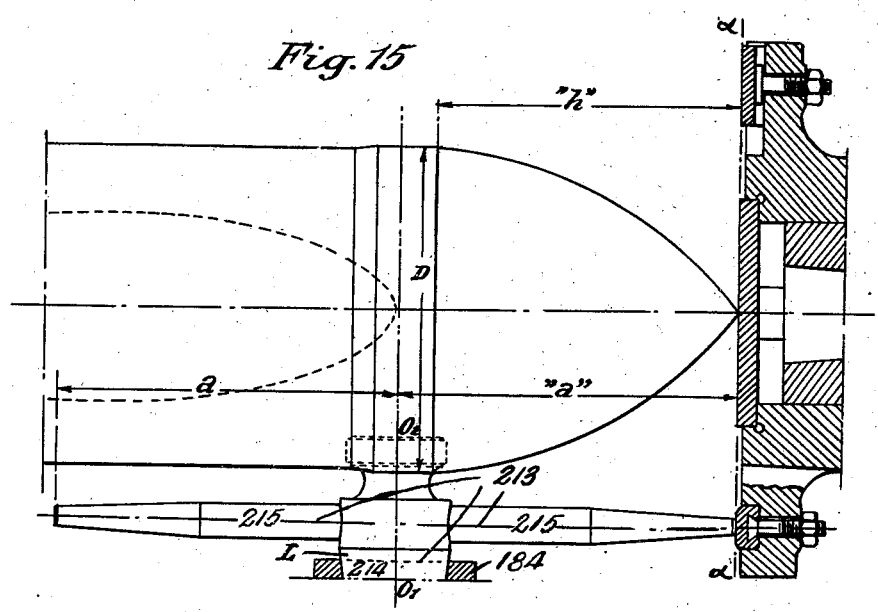
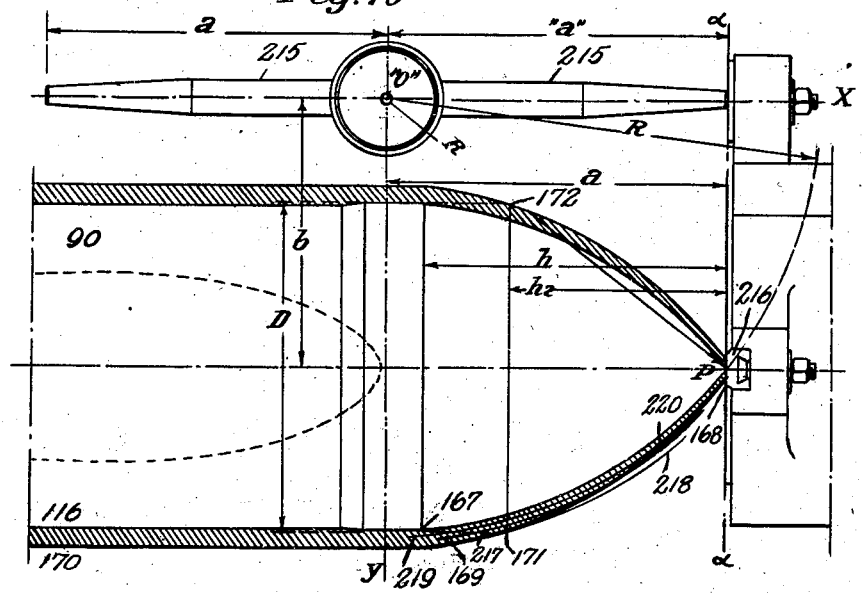

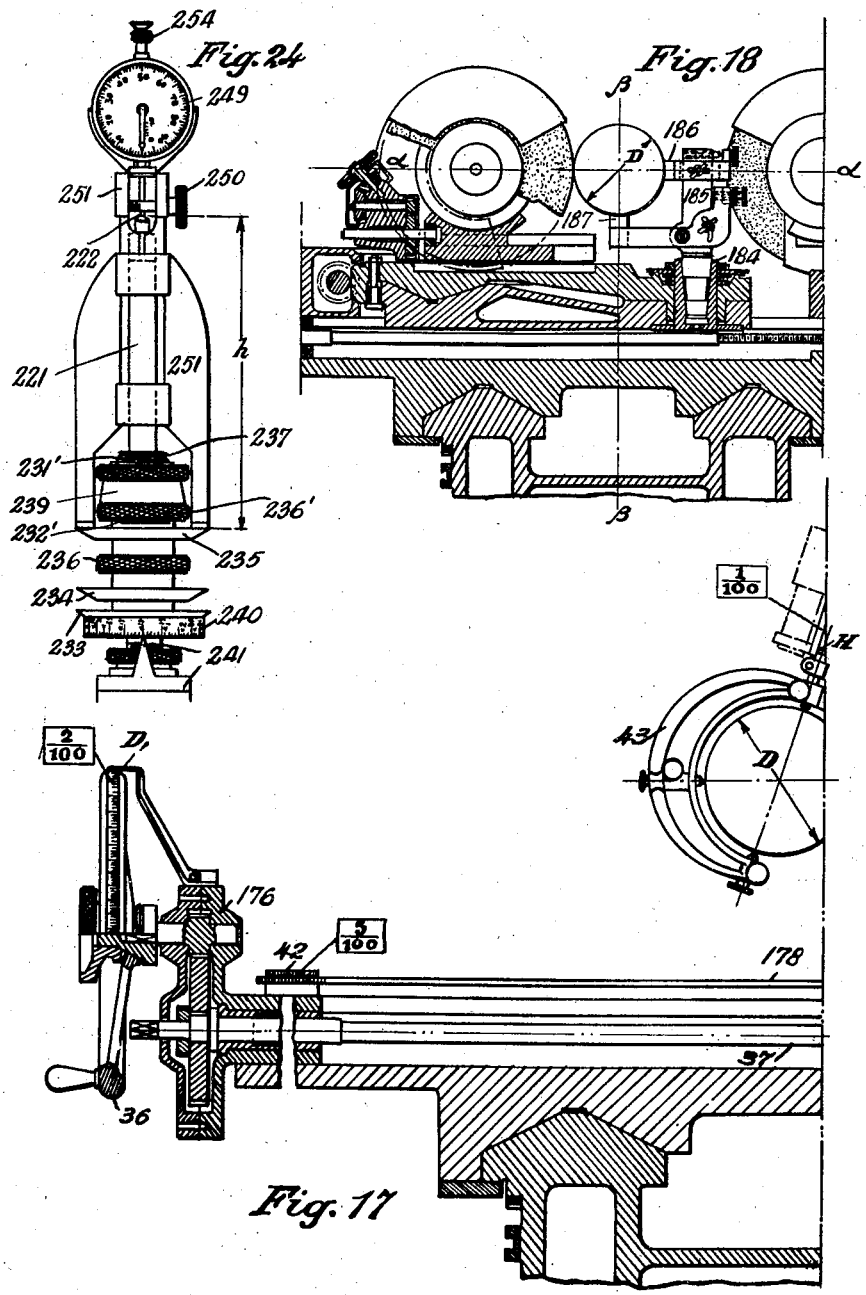

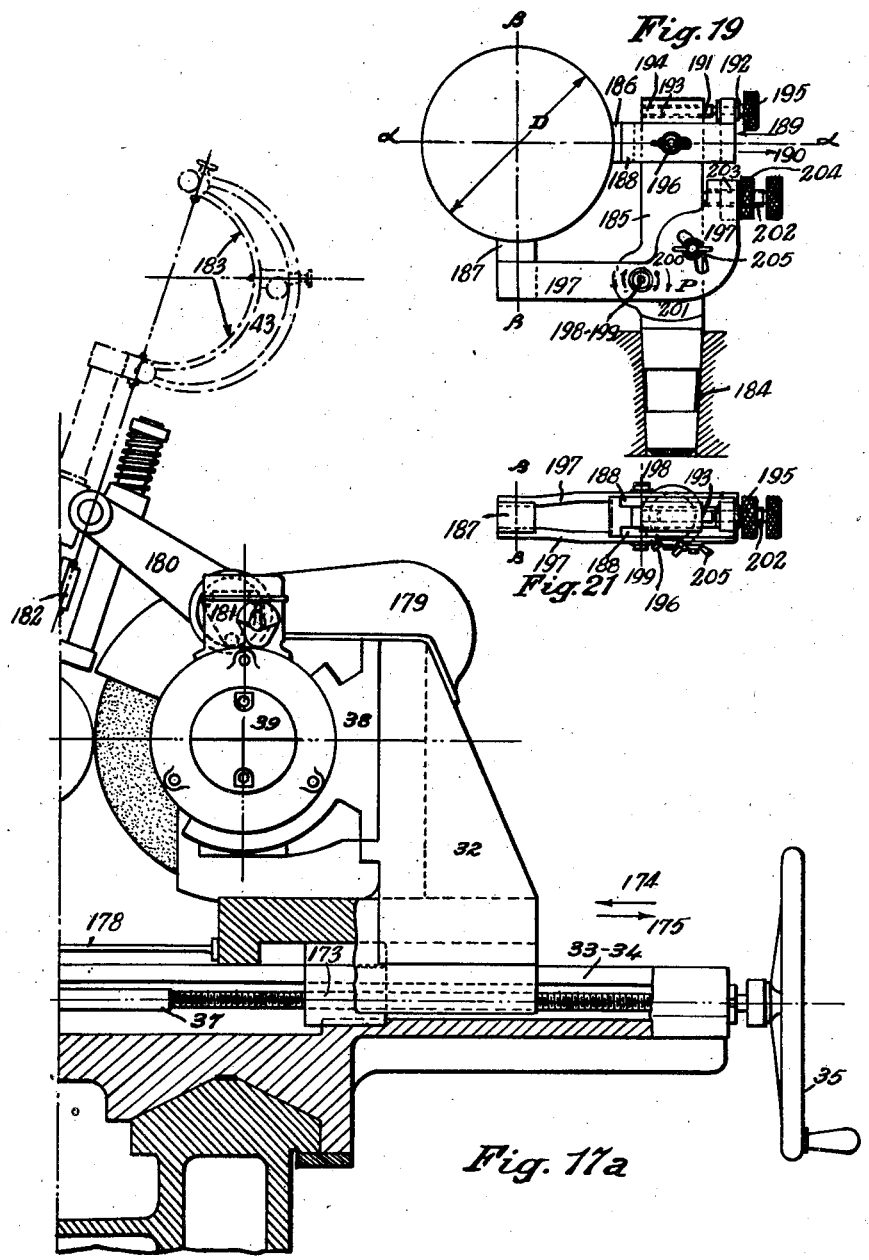

Oct. 22, 1935.  V. FLAGIELLO  2,018,123
MACHINE FOR FINISHING ARMOR PLATE PIERCING SHELLS
Filed July 24, 1933   11 Sheets-Sheet 11
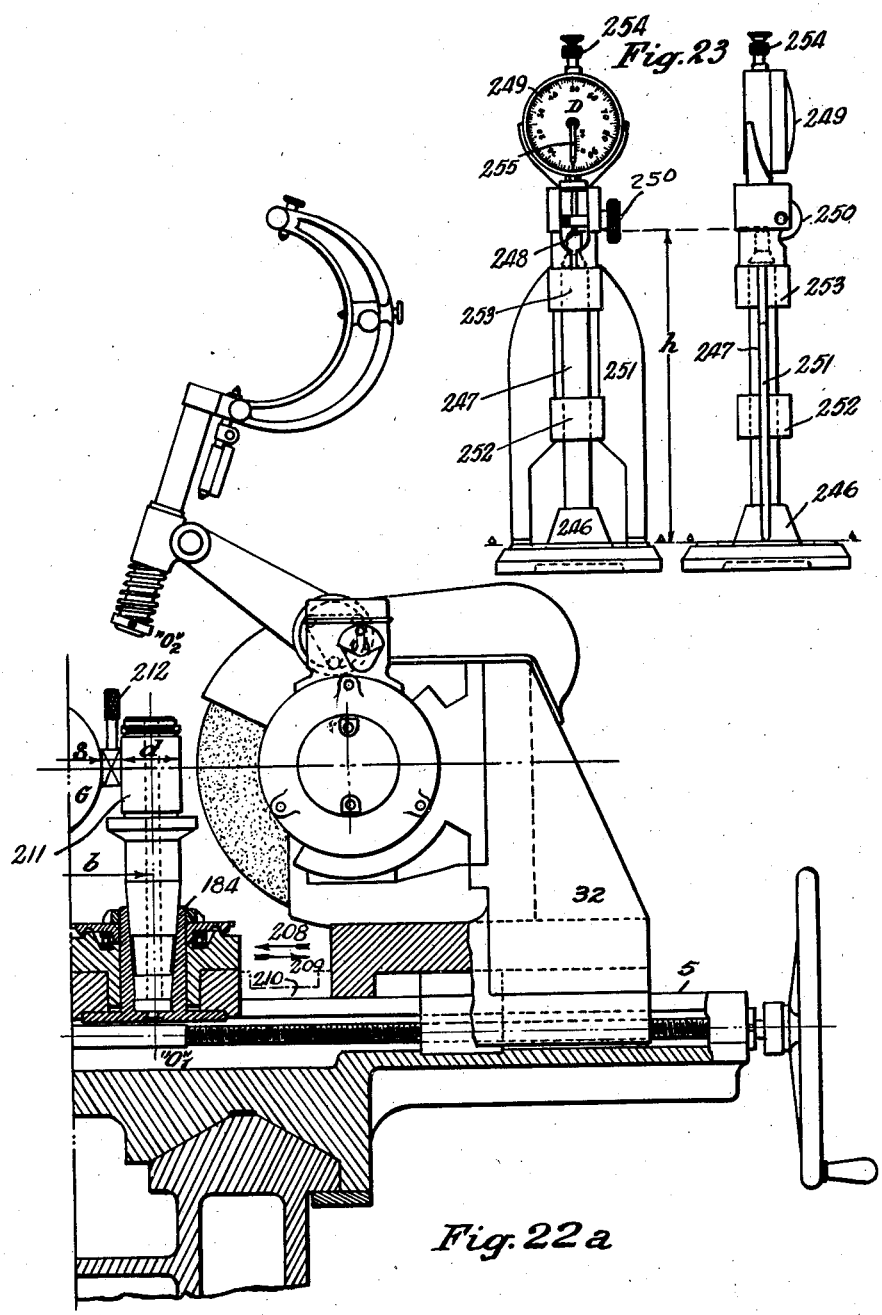
V. Flagiello
INVENTOR
By: Marks + Clerk
Attys.

Patented Oct. 22, 1935

2,018,123

UNITED STATES PATENT OFFICE 2,018,123

MACHINE FOR FINISHING ARMOR PLATE PIERCING SHELLS

Vincenzo Flagiello, Terni, Italy

Application July 24, 1933, Serial No. 682,029
In Italy December 14, 1932

20 Claims. (Cl. 29—28)

This invention relates to improvements in machines for finishing armor plate piercing shells.

The object of the invention is the provision of a machine of this character provided with rotary grinding devices respectively adapted to the finishing of the fore ring and the ogival head of the shell with extreme precision. A further object of the invention is the provision of means for automatically effecting operation of the grinding devices and permitting adjustment thereof.

A further object is the provision of a tool adjustably mounted on the same carriage which supports the two grinding devices and which is designed for finishing the cylindrical or conical body of the shell.

A further object is the provision of a machine of this character provided with devices for ensuring accuracy and precision in the adjustment of the parts and in the work performed thereby.

In the accompanying drawings:

Figure 1 is a diagrammatic plan view of the ogival head of a shell showing the shape thereof and the application of the cap thereto.

Figures 2 and 2ª taken together present a side elevation of the machine.

Figures 3 and 3ª taken together present a top plan view of the machine.

Figure 4 is an enlarged detail section through a work piece positioned on the rotating mandrel or work holder.

Figure 5 is a detail section of the coupling between parts of the work holder.

Figure 6 is an enlarged detail section taken vertically through the main carriage in the plane of the vertical shaft controlling the reversing of the drive gear for the main carriage.

Figure 7 is a top plan view of the arrangement shown in Fig. 6.

Figure 8 is a detail section taken at right angles to Fig. 6 of the lower portion of the reversing shaft and the related parts.

Figure 9 is a fragmentary side elevation of a shell in the position in the machine showing parts of the devices associated therewith for securing accuracy in the operation of the machine.

Figure 10 is a top plan view of Figure 9.

Figure 11 is a fragmentary top plan view illustrating the parts of the machine in one position and the front end of the shell temporarily engaged in a support.

Figure 12 is a top plan view similar to Fig. 11 but showing the arrangement of the device for truing the face of one of the grinding devices.

Figure 13 is a fragmentary sectional view showing the truing device in side elevation.

Figure 14 is an end view of the member 89.

Figure 15 is a view similar to Fig. 9 illustrating further details of the invention.

Figure 16 is a top plan view of Fig. 15.

Figure 17 is an enlarged transverse sectional view through the main carriage and illustrating the grinding device for the fore ring, the adjusting means therefor and related parts.

Figure 18 is a detail section taken transversely through the carriage and showing parts of the diameter determining means.

Figure 19 is an enlarged elevation of a part of the arrangement shown in Fig. 18

Figure 20 is a front view of the projectile rest.

Figure 21 is a plan view of the projectile rest.

Figures 23 and 23ª are front and side views, respectively, of indicating devices associated with the invention.

Figure 24 is a further view of the device shown in Figures 23 and 23ª.

Figure 25:
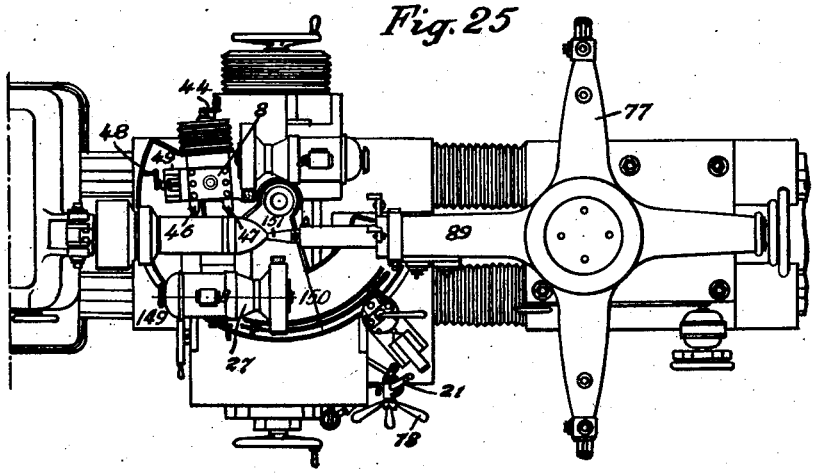

Figure 25 is a fragmentary plan view of the machine showing further adjustment thereof.

Referring to the drawings in detail 1 indicates the housing of the main driving motor (not shown) by which rotary motion is imparted to the work holder 4 mounted in the head stock 3 and to other parts of the machine as will hereinafter appear. The main carriage is indicated at 5 and is movable longitudinally along the table 14 in the direction of the arrows 6. 7 designates a supplemental carriage mounted for pivotal movement about the axis O. A tool holder 8 is adjustably mounted on the main carriage 5 and 9 and 10 designate levers for controlling the speed of the machine, the numeral 11 designating windows for observing the condition of operation of the lubricating system. Control wheels 12 and 13 are provided for starting and stopping the operation of the holder 4.

15 designates a drive shaft driven from the motor of the casing 1 and extending through and operating the internal mechanism of the carriage 5 as will be hereinafter more fully described.

The numeral 16 designates a group of elements mounted on a second carriage 58 at the end of the table 14 opposite the housing 1 and includes a central body 89 and an upper body 77, the latter being rotatable about the axis L, M. 17 is a shaft associated with the friction drive between the main motor and the machine, the control of the shaft 17 being effected by a chain 20 coupled with the hand wheel 13. The longitudinal reciprocation of the main carriage 5 is manually controlled by levers 18 and levers 19 are provided for regulating the speed of reciprocation thereof as well as the speed of oscillation of the pivoted carriage 7.

The lever 21 is adapted for connecting and disconnecting the driving gear for effecting reciprocation of the carriage 5 and the lever 22 is adapted for controlling the oscillating movement of the carriage 7 about the axis O. The device designated generally at 23 is for effecting the oscillatory movement of the carriage 7 and also the reciprocation of the main carriage 5. The lever 24 is for permitting manual adjustment of the device 23 for changing the direction of movement of either of the carriages 5 or 7.

Adjustable stops 26 are fixed to an arcuate support 25 and coact with the devices 23 for limiting and reversing the movement of the pivoted carriage 7.

A grinding device designated generally at 27 is adjustably mounted on the pivoted carriage 7 and is designed for finishing the ogival heads of the shells, the grinding device being adjustable along guides 28 and controlled by a hand wheel 29. The operation of the grinding device is effected by an electric motor which is controlled by a switch 30 and the supply of water for grinding purposes is controlled by a valve 31.

A second grinding device for finishing the shell fore ring is designated at 39 and is mounted on a support 38 secured to a carriage 32 which latter is movable on guides 33 and 34 on the main carriage 5 and adjustable by means of hand wheels 35 and 36 one at the rear and the other at the front of the machine, said hand wheels acting on a feed screw 37. The grinding device 39 is also operative by an electric motor under the control of a switch 40 and is provided with a water valve 41. 42 designates a graduated scale for indicating the position of the carriage 32 and a device for measuring the diameter of the fore ring is designated generally at 43.

Cutting tools 46 and 47 are mounted in the holder 8 which latter is adjustable in a direction perpendicular to the axis of the work holder 4 by means of a crank 44 and screw 45, the tools 46 and 47 being adapted for turning the cylindrical body of the shell. Movement of the tools 46 and 47 in the direction parallel to the axis of the work holder is effected by displacing the holder 8 along the guides 49 by means of a crank and screw 48.

A gauge 50 is mounted on a supporting arm 51 and movable to the dotted line position designated at 52 in Fig. 2.

A rack 53 extends along the length of the table 14 and supports stops 55 which are adjustable by means of tightening screws 56, the stops 55 coacting with the reversing gear to be hereinafter more fully described. A control rod 57 is mounted for longitudinal displacement in the carriage 5 and during motion of the latter back and forth on the table 14 it is alternately moved in opposite directions upon engagement with the stops 55. The carriage 8 supporting the group of elements 16 may be adjusted manually by a hand wheel 59 or may be driven by an electric motor 60 along the table 14, the motor being controlled by a switch 61 and a speed reducing gear 62 being provided. Slight displacements of the carriage 58 are effected by a hand controlled wheels 63 and 64 designate the casing for the chain transmission.

A slide bar 65 is mounted in the central body 89 of the group of elements 16 and is adjusted by means of a screw 66 actuated by a hand wheel 68 and coacting with a nut 67. The operation of the screw 66 may be effected automatically by means of a motor 70 coupled with the screw through a friction drive 69, the operation of the motor being controlled by a switch 71. 72 is a fixed pivot and 73 is a magnetized disk removably fitted in the end of the body 89. Electric lamps 74 and 75 are provided in the region adjacent the end of the body 89, and 76 is a stop for the pivoted arm 77 constituting the uppermost of the group of elements 16, the arm being rotatable through 160° about an axis L, M.

The arm 77 supports at each end a shell supporting blade 78 each pivotally connected at 79 with a shank 81 and adjustable relatively thereto by an adjusting screw 80. Longitudinal movement of each shank 81 is effected by a rack and pinion arrangement actuated by a shaft 82 and the movement of the shank is limited by stops 83.

The portion of the table 14 intermediate the carriages 5 and 58 as well as the supporting and actuating devices associated with the grinding device 39 and the tool holder or carriage 8 are protected from the accumulation of dust or the like by bellows-like covers 85.

As shown in Fig. 3ᵃ the arm 77 is turned to a position convenient for grinding purposes and the empty blade at the top of the figure is adapted to receive the shell supported on the holder 4 when the operation thereof is completed while the blade at the lower end of the arm contains a shell 86 adapted to be next applied to the work holder 4.

Figure 1, as stated is a diagrammatic view of the cap and shell head designated at 87 and 90, respectively, the axis of the shell and cap being designated at $X_1$, $X_1$.

The quantities for the determination of the ogival head are the following:

"D"—Diameter of the shell fore ring.

"R"—Radius of the curve P$d$, the generator of the ogival surface.

"O"—Center of the generator R P$d$ around which the grinding element of the grinding device 27 oscillates.

"$a$"—Abscissa of the trace O.

"$b$"—Ordinate of the trace O.

"$h$"—Height of the ogival surface.

"$\alpha$"—The angle comprised between the tangents PQ and PS extending from the point of the ogival head and touching the surface of the latter.

It will be understood that for the mechanical manufacture of the ogival shape in a precise manner it is necessary to be able to correct all of the above elements during operation. The present machine makes it possible to perform and test the work at the same time. Accordingly the finished work presents a high degree of precision.

When the shell 90 reaches the machine to be finished, the machining of the internal cavity thereof has already been effected, together with the threading of the base portion 91. The shell holder 4 includes a mandrel-like member 92 having a cavity snugly fitting the tapered member 93 of the head stock and held in position by check nuts 94. Dowel-like members 95 are inserted by means of bolts 96 between the flange 97 of the head stock and cavity 98 of the holder member 92 and the purpose thereof is to effect vibration of the work during operation.

A central hole of the holder member 92 is concentric with a threaded recess 100 and is adapted to receive a screw 99. The screw is provided with a flange 101 bearing on the inside of the cap nut 102 screwed on the holder member when the latter is to be taken out of the machine.

The holder member is provided at its terminal with a centering ring 103 engageable with the interior of the shell 90 and with a second ring 104 and a third ring 105, and the ring 104 engages the interior of the base of the shell and the ring 105 forms a guide for the lock nut 106, the front part of which is conically shaped similarly to the rear end of the shell body. The nut 106 is threaded on the holder member 92 and the purpose thereof is to center the base of the shell and to prevent unscrewing of the latter when it is subjected to the action of any one of the grinding or working devices which would tend to unscrew the work. The threads herein referred to as will be understood, as those designated at 107 which are formed on the member 92 and are fitted in the interior of the shell.

It will also be understood that the two operations necessary in securing the shell in position are, first, advancing it on the screw thread 107 and thereafter clamping it in position by the adjustment of the lock nut 106, the threads of the lock nut being pitched oppositely from the threads 107.

The mechanism which is constituted in part by the above noted device designated at 123 for automatically controlling the reciprocating movement of the main carriage 5 and the pivoted carriage 7 is illustrated in detail in Figs. 6 to 8 and comprises a yoke 108 coacting with a drive sleeve indicated in dotted lines at 109 in Fig. 8, the sleeve coacting with coupling means 110 and 111 which, during alternate engagement with the sleeve 109 effect the forward and reverse movements of the carriages 5 and 7. A reversing shaft 112 is journaled at its lower end in a bearing 114 in a support 115 and is provided with gear teeth 113 meshing with a rack formed on the rear of the movable yoke 108. The other end of the shaft 112 is keyed at 116 to a cross bar 117 and secured thereto by a lock washer and a nut 118 and 119. A tubular shaft 120 is loosely mounted on the shaft 112 and is provided with gear teeth 121 in mesh with rack teeth on the control rod 57 whereby the movement of the latter relative to the carriage 5 incident to engagement of the rod 57 with either of the stops 55, produces a limited rotary movement of the tubular shaft 120. The lower end of the shaft 120 rests on a thrust washer 122 and the other end is keyed at 123 to a plate 124 to which latter the above mentioned control lever 24 is secured.

The plate 124 is provided with arcuate slots 125 receiving the upstanding pins 127 movable in the arcuate slots 125 to a limited extent which is determined by two relatively adjustable screws 126 fitted in the end walls of each slot. A pivot pin 128 is fixed to the plate 124 and supports a roller 129 adapted to be alternately engaged with stop members 26 during oscillation of the pivoted carriage 7. The support for the upper ends of the shafts 112 and 120 is designated at 130, a bushing 131 being provided therein.

A pressure member 132 is provided with a roller 133 mounted on a pin 134 fixed in place by a lock member 135 and held against rotary movement by a key 137 in a guide cylinder working in a groove 136. The pressure member 132 is normally urged toward the plate 124 by a spring 138 the tension of which may be varied by a nut 139 held in position by a lock nut 140.

Rotary movement of the shaft 15 is transmitted to the sleeve 109 actuated by the fork 108 and depending on direction of movement of the sleeve in the direction of the arrow 141 or the arrow 142 a driving movement is imparted to the carriage 5 or the carriage 7 in one direction or the other by a suitable driving gear.

In the case of the reciprocating movement of the main carriage 5 as when finishing the fore ring of the shell by means of the grinding device 39, when the said carriage arrives at one of the ends of its movements, the rod 57 is displaced and a turning impulse is transmitted to the shaft 120 and through the plate 124 and pins 127, when the latter abut the ends of the screws 126, to the cross bar 117. It will be understood that the screws 126 are so adjusted as to afford a limited range of movement between the plate 124 and the bar 117. The movement of the bar 117 is imparted to the shaft 112 and the gear teeth 113 thereof effect the displacement of the yoke 108 and also the controlling sleeve 109.

The plate 124 is provided with a point or cam 144 which, when the plate 124 is in the medial position shown in Fig. 7 displaces the member 132 and compresses the spring 138. However, when the prominent point of the cam moves beyond the roller 133, the tension of the spring 138 exerts on the inclined side face of the cam causes a rigid snap-like action of the plate 124 to its alternate position, the movement being accommodated by the clearance space between the screws 126 and the pins 127 and the tension of the spring also acts to maintain the parts in position after an actuation thereof.

In the case of the use of the grinding device 27 for finishing the ogival head, the driving gear is so arranged as to impart oscillatory movement to the carriage 7 about the axis O, the movement of the latter being periodically reversed as the roller 29 is alternately engaged by the two stops 26. According to this operation, when one of the stops 26 is brought into engagement with the pin 28 and displaces the plate 124, movement of the latter is transmitted to the shaft 112 through the pins 127 and bar 117 thereby effecting displacement of the controlling yoke 108 through the gear teeth 113 and the rack teeth of said yoke. By the alternate movements thus imparted to the plate 124 the carriage 7 is turned first in one direction and then in the other by the power supplied through the shaft 15 and at each operation the spring pressed roller 133 operates in the manner above described.

Figures 2 and 3 illustrate the machine adjusted for effecting the finishing of the ogival head of the shell and when the operations on this shell are completed the same is removed from the machine, supported on the blades 76 and the arm 77 is turned so as to present a next shell 86 in position for working. Preliminary to the removal of the finished shell, the grinding device 27 is caused to rotate until its axis 149-150 is substantially parallel to the axis of the shell and said device is withdrawn from operative position by a suitable adjustment effected by the hand wheel 29. After the shell is released by partially loosening the ring 106, the arm 77 is turned so as to lie parallel to the axis of the shell and the carriage 58 is advanced by the motor drive 69 set in operation by the switch 61. When the shell is completely loosened and supported in the blade 78, the carriage 58 is returned to its initial position, the arm 17 is turned through 180° and the carriage 58 again advanced to present the shell 86 in the position for attachment to the holder 4.

Ordinarily the work holder 4 provides an adequate support for the shell undergoing the finishing operations but if desired a support for the point end may be utilized. For this purpose, after the unfinished shell is applied to the work holder, the grinding device 27 is adjusted by means of the hand wheel 29 so as to cause the grinding element thereof to remove the roughness and also to properly center the apex of the head. Thereafter the grinding device 27 is turned about the axis O until the axis 149—150 is approximately parallel to the axis of the shell and then the support 151 is applied and held in position on the body 89 in the bar 65, the advance of the bar 65 being effected by suitable manipulation of the driving motor, and gear 70 and 69.

A dressing tool for truing or dressing the face of the grinding element of the device 39 is fixed to the bar 65 and engageable in a recess 53 when said bar is returned to its normal position. By manipulating the lever 21, a rapid movement of the carriage 5 may be effected until the grinding element of the device 39 is presented to the dressing tool 152 and the arrangement is such that the distance between the point of the tool 152 and the axis of the work is equal to $D/2$, D being the diameter of the fore ring.

The left end of central piece 89 is illustrated in Figs. 2ª and 3ª and as shown in detail in Figures 9-10 and 14, it is formed with two projections 154 and 155 provided with holes for bolts 156 and 157, the heads of said bolts being lodged in undercut grooves provided in tempered dowels 158 and 159. These dowels may slide along their seats and when once firmly clamped thereto have their plain outside surfaces disposed in the plane $\alpha\ \alpha$. In the same plane is also to be found the outside surface $73^1$ of disc 73 seated in the recess 160. The disc 73 is provided with three holes 161, 162, 163 (Fig. 14) for the easy removal from and application in the seat 160, and it is strongly magnetized so that as soon as it comes near the recess it takes the exact position required. Thus, the outside surfaces of the three parts 158, 159 and 73 lie directly in the plane $\alpha\ \alpha$ normal to axis $X_1X_1$ of the shell, said plane being adapted to come in contact with the shell point P. Casings 164 and 165 are arranged about the lamps 75, 74 for projecting light on the outside surfaces of the dowels 158 and 159. As to the manner of determining the quantities "$a$" and "$h$" this will be described hereinafter.

Considering now Figures 15 and 16 illustrating the shell ready for work and provided with the necessary allowance for machining, represented in Fig. 16 as comprised between 166, 167, P and 168, 169, 170 it is to be noted that the allowance is variable for each shell while the length of the shell cannot be constant though contained within the limits allowed. Mechanisms are then necessary to effect in the least time and greatest exactness the following:—

First, the determination of diameter D and of the ogival directrix acting circumference that is exact finishing of the shell fore ring to the diameter D.

This being done, owing to the presence of the allowance mentioned, the plane containing the circumference ogival directrix has been displaced in 171, 172 at a distance $h_2$ from the plane $\alpha\ \alpha$ normal to the shell's axis and passing through the shell point P, smaller than the distance $h$ to be realized.

Second, the determination for each shell of the coordinates "$h$" and "$a$" of the rotation axis O of the grindstone in order to effect the perfect finishing of the ogival head by removing the least quantity of metal during the ogival finishing.

Third, the possibility of amending the ogival height "$h$" during the period of original finishing in function of any value assumed for the diameter "D" and container within the limits allowed by the drawings in order that the angle "$\alpha$" of the sharp pointed cone and the ogival radius R remain absolutely constant.

The above three functions are performed by the following devices:

*First.*—Motion is transmitted to the grinding device 39 by the two handwheels 35 and 36, of which the wheel 36 is connected with the screw 37 by a speed reducing gear 176 whereas the wheel 35 is directly connected with the screw. A nut 173 coacts with the screw 37 to move the carriage 32. The handwheel 36 is furthermore graduated along the outside surface so that by means of the tilting index 177, displacements, for instance of 1/100 mm. of the grinding device support towards the shell and consequently of 2/100 mm. on the value of the shell's diameter may be effected, the consumption of the grindstone during work not being considered.

The scale 42 includes a rod 178, rigidly connected to the carriage 32 and provided on the left hand end with a millimeter scale and vernier, the latter by means of a magnifying glass allowing the easy reading with an approximation of 5/100 mm.

The bracket-shaped carriage 32 is also provided with another support 179 to which is attached the arm 180 capable of rotating around the pivot 181 and of being rigidly fixed to support 179. To arm 180 is hinged the above mentioned gauge 43 provided with a 1/100 mm. indicator 182. The dotted lines 183 indicate the position assumed by the indicator in the period when it is not in use.

It is evident that for all the shells following the first one, the operation of grinding to the exact diameter D is particularly easy. In fact, after grinding the first shell to the diameter D by usual measuring means, the vernier of scale 42 is brought to zero; the graduated scale of handwheel 36 and the indicator 182 are also brought to zero at the same time. As to the subsequent shell, the operator may safely proceed in the work of removing metal till the vernier of scale 42 has returned to the zero; and owing to the greater reading approximation more metal will be removed till the handwheel 36 is subsequently brought to zero against the index 177. At this moment the diameter "D" of the shell is still larger than that desired, the slight difference being due to the consumption of the material of the grindstone during the previous operation. For the exact determination of this difference, the gauge 43 is used, which when tilted over on the shell according to the position shown in Figure 17 allows by the 1/100 mm. indicator 182 the measurement of the metal excess still existing on the shell. The removal of said excess is proceeded with until the indicator hand is brought to zero. In this manner the exact value of "D" is maintained by a process of successive tests without stopping the working of the piece.

Before beginning the finishing of the ogival head the rest Figs. 18 to 21 is applied in the cavity of pivot 184 for the carriage 7 the rest comprising a central stand 185 bearing two blocks of box wood or fiber 186—187 said blocks being shaped according to the cylindrical surface with diameter "D". The bottom truncated conical end of the central stand by means of a suitable key or the like is held in a definite position with respect to the shell axis. Consequently the cylindrical surfaces of blocks 186, 187 will have their axes parallel to those of the cylindrical surface of diameter "D" whenever the rest stand 185 is lodged in the seat 184.

The upper block 186 is supported by the fork 188 and serves for the elimination of the oscillation of the shell according to the horizontal plane $\alpha_2\alpha_2$. Said fork as shown in Fig. 19 may slide in the cavity provided in the upper part of stand 185 according to arrows 189—190 the fork being moved by two discs 191, 192 fixed to a screw 193 working in the threaded hole 194 provided in said stand. By rotating the milled head 195 the block 186 is brought to bear against the shell and in this position it is fixed by lock screw and nut 196. The lower block 187 serving for the elimination of the oscillation of the shell according to the vertical plane $\beta_2\beta_2$ is supported by a second fork 197 adapted to oscillate on stand 185 about the axis 198—199 in the direction of arrow 200—201. The screw 202 threaded in the angular end 203 of the fork 197 by acting against the stand 185 causes the fork to rotate about the axis 198—199 so that the block 187 is brought to bear against the cylindrical surface of diameter "D". The check nut 204 and retaining screw 205 serve to rigidly fix, as required, the position of block 187.

Figure 22:
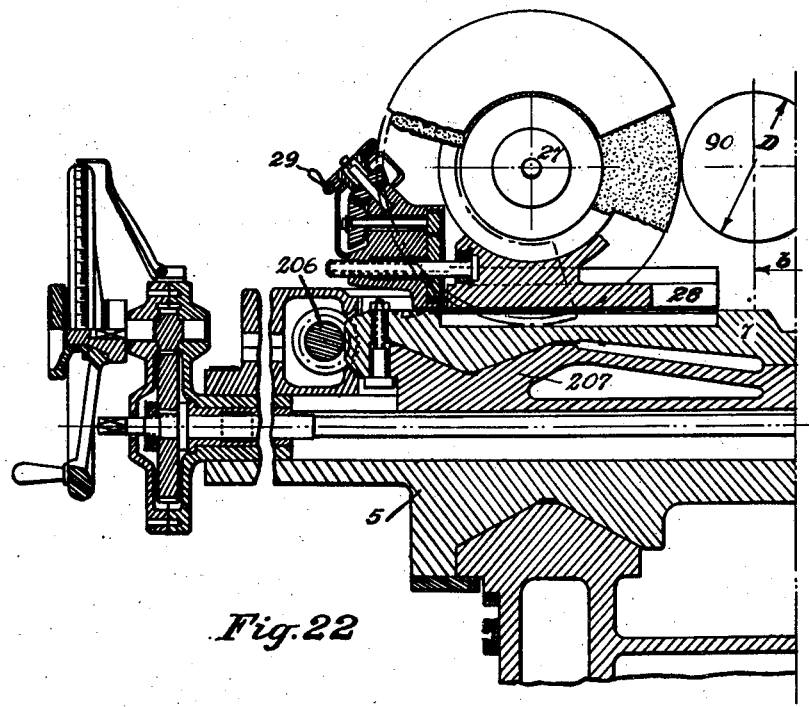
Figure 22 is an enlarged transverse sectional view through the main carriage illustrating further details of the invention.

Second.—In Fig. 22 is illustrated the action of the circular carriage 7 rotating about the axis $O_1O_2$ controlled by feed screw 206. The carriage and cradle 207 may be caused to slide according to arrows 208—209 on guides of the main carriage 5 by the carriage 32 and for this purpose said carriage and cradle may be connected by a coupling indicated at 210. The cradle 207 is provided with a graduated scale with vernier and magnifying glass allowing the estimation of the coordinate "b" with an approximation of 5/100 mm. Owing, however, to the great exactness to be possessed by the coordinate "b" it is possible at the beginning of the work of a series of shells to obtain, as follows, a second and safe checking. The pivot 184 around which the circular carriage 7 oscillates is fixed to the cradle 207. In the cavity of the pivot the column 211 may be exactly lodged, the upper end of said column having the diameter "d" already known. As soon as the grinding of a shell 90 for obtaining a value "D" is finished, a block 212 is manufactured whose thickness is $$s = b - D/2 - d/2$$

Then the block is arranged as shown in the figure, thus the distance between the rotation axis $O_1O_1$ of the carriage 7 and the axis of the shell in course of work is exactly "b". This value "b" will remain constant during the whole work of a certain type of shell, consequently the cradle 207 will be secured on the main carriage 5 and coupling 210 may be removed.

In the truncated conical cavity of pivot 184 the caliper 213 with shank 214 may be arranged, the caliper being exactly shaped like said cavity of pivot 184.

The caliper 213 is provided with a rod 215 whose ends are exactly at the distance "a" from the axis $O_1O_2$ (Fig. 15). Consequently after introducing the caliper 213 in the seat of the pivot mentioned, as shown in Fig. 3 by operating the commutator 61 (Fig. 2a) the group 16 is allowed to advance against the shell's point. When the magnetized disc 73 of Fig. 3a is at a little distance from the shell point then by turning handwheel 63 a slower approaching movement of group 16 towards the shell point may be produced until the magnetized disc comes in contact with said point of the shell. Then by acting on the hand crank 18, Fig. 3, the main carriage 5 and the two grinding devices 27 and 39 are displaced until the right end of the caliper 213 touches the plate 159. Figures 15 and 16 illustrate the whole when the operations have been effected.

"$\alpha, \alpha$," is the plane normal to the shell's axis passing through the shell point "P". This plane is the starting point for fixing in each shell the co-ordinate "$a$" this being the only element allowing to bring the ogival head to the best finishing degree with the least removal of metal, in fact:

The lines 167P and 168, 171 show the metal allowance after the finishing of the fore ring, that is until the diameter D has been obtained. After regulating the position of the stops 26 for the pivoted carriage stroke end, said carriage holding the grinding device 39 adapted to the work of the ogival head, it is noted that the small plane 168, 216 contains the shell's point "P", corresponding to the ogival head already finished. When subsequent metal removals take place the outside surface of the grindstone will only describe arcs 217, 218, 219, 220 always concentric with "O". In such manner an instant comes (which may be easily determined) on which the circle contained in the plane 168, 216 will have such a small diameter as to be reduced to a point P constituting the point of the ogival head finished. At said instant the arc of circle with centre "O" passing through the point "P" referred to axes OX and Oy is exactly the ogival arc of radius "R" wanted, the coordinates of a point "P" ("$a$" "$b$") of said arc exactly corresponding to the known equation of the circle with centre "O" and radius "R"

$$\sqrt{a^2 + b^2} = R$$

To the above method of testing the exactness of the ogival finishing another has been added confirmed by experience as very useful. This second method allows:

Third.—Possibility of measuring and amending the ogival height "$h$" during the period of ogival finishing in function of the diameter "D", and of any other value whatever assumed within the allowance limits so that the angle $\alpha$ of the sharp pointed cone and ogival radius "R" remain absolutely constant.

In Figures 2 and 3 the supporting arm of the apparatus designed for this purpose is shown by reference number 51, while the details are illustrated in Figs. 9 and 10.

The apparatus comprises a central rod 221 terminating on the right in a ground flat surface 222 and having a knurled nut 223 coupled to a part 224 which is square in section. The rod left end 225 of the rod contained in the sleeve 226 may slide according to arrows 227 and 228 when the threaded rings 229 and 230 are acted on. On the cylindrical central section 231 of the rod is fitted with slight friction the sleeve $232^1$ on which may rotate another sleeve 232 provided with three discs 233, 234, 235 and the knurled central surface 236. The sleeve $232^1$ terminates at the right with the gripping jaws 237 which are threaded in correspondence with and fit the cylindrical threaded part 231¹ of rod 221 with 1 mm. pitch. The position of sleeve 232¹ may be fixed on rod 221 by tightening the nut 239 the functioning of which is obvious. The back crown 233¹ is provided with a ring 240 provided with a correction scale hereinafter more fully described, the reading of the scale taking place by means of the index 241.

Since it is possible to exactly finish the fore ring, the said apparatus is utilized as a second testing means for the exactness obtained in the ogival finishing.

Supposing that in Fig. 10 the shell is shown with the fore ring already finished with the diameter "D" required, the ogival head, owing to the presence of the metal allowance has the trace on the plane containing its circumference directrix in 171, 172 at the distance $h_2$ from the plane $\alpha, \alpha$, normal to the shell's axis and passing through the shell point. As the grinding device passes gradually from the circular trajectory 217, 218, to the 219, 220 the traces of the planes containing the further circumferences directrixes will reach respectively the position 242, 243 and 244, 245 at the distances $h'_2$ and $h''_2$ from the plane $\alpha, \alpha$.

After taking care of fixing the surface $\Delta\Delta$ of disc 235 at the exact distance $h$ from end 222 of rod 221 this end being on its turn contained in plane $\alpha, \alpha$, already defined, a moment comes in which owing to the continuous action of the grinding device the trace of the plane containing the subsequent directrixes coincides with the plane $j, j$. At this moment of the coincidence of said planes $j, j$, and $\Delta\Delta$ the ogival head of the shell, owing to evident geometrical consideration, possesses all the desired characteristic ogival measures.

Adjustment of the apparatus for the ogival height "$h$" is effected as illustrated in Figs. 23 and 24. The supporting disc 246 is provided with a rod 247 the end 248 of which is at the exact distance "$h$" from the base plane. The quadrant 1/103 mm. indicator 249 is mounted and fixed by the screw 250 on a support 251 adapted to be perfectly guided on rod 247. By acting on knob 254 the hand 255 is brought to zero. Then the rod 247 is removed and the apparatus is mounted on rod 221 (Fig. 24) of the device above described on which the check nut 239 has been previously released. By acting the knurled surface 236 the whole sleeve 232 is rotated in one direction or the other and will be displaced accordingly until the hand of the quadrant indicator 249 is brought back to zero. The graduated ring 240 will be also rotated till its zero mark coincides with index 241. Then the nut 239 is tightened, the desired object having been obtained.

Owing to known geometrical considerations there exists in each shell in the case of a parity of the value D, that is of the diameter of the fore ring, being supposed, a certain relation between the diminution of the value of R and the corresponding displacement of trace $j, j$, of the plane containing the base of the ogival head towards the base of the shell. In a certain type of naval shell for instance owing to an error of less than 1/10 mm. in the value of "R", the trace $j, j$, is displaced towards the base of the shell 11.5 times the same value, more precisely of 1.15 mm. Now since the quasi contact of edge $j, j$, of the shell with edge $\Delta\Delta$ of disc 235 may be valued by naked eye with an approximation even less than of 1/10 mm., the consequence may be deduced that the maximum error to be committed in realizing the value of "R" cannot be greater than the eleventh part of the valuation error, that is it cannot attain approximately 1/100 mm.

Owing to different causes some shells may happen to result with a diameter $D_1$ of the finished fore ring smaller than "D". In this case, in order to obtain the constancy of "R" and of the value $\alpha$ of the sharp pointed cone, so that the concave ogival surfaces of the caps and the convex ogival ones of the shell's heads may exactly fit to one another, it is necessary to stop the operation of finishing the heads when a value "$h_2$" is obtained smaller than the one "$h$" of the distance of the base plane of the ogival head from the shell point. The operation is as follows: On a system of cartesian coordinates are taken as abscisses the different values of diameter "D" contained within the minimum and maximum limit allowed. Then the curve of the values of displacements in millimeters towards the shell's point from the base plane of the head is constructed for the single values in minus of the diameter "D". Then it will be easy to read on the axis of the ordinates the entities of said displacements.

And since every error in minus of 1—2—3 unities committed or wanted in the value of D may be read on the indicator 182 (Fig. 17) and once the new value of the diameter is individuated on the axis of the abscisses in the cartesia system then on the axis of the ordinates, through the curve representing the function, there will be also found the signs 1—2—3 according to the errors of 1—2—3—... in minus already verified on the value "D". The interval between the signs 1—2—3 on the axis of the ordinates is connected to the interval of the errors of "D" by known geometrical proprieties. The operator, after reading on the axis of the ordinates the value 1 or 2 or 3 has nothing to do but release the nut 239 (Figures 9 and 10) and turn the sleeve 232 by acting on surface 236₁ till the sign 1 or 2 or 3 of ring 240 passes under the index 241. In this way the plane $\Delta\Delta$ and therewith the plane $j, j$, will be displaced to 244, 245 the value "$h$" being reduced to that wanted $h''_2$, the radius of curvature "R" and the opening "$\alpha$" of the sharp pointed cone remaining constant.

The device for truing and adjusting the grinding element of the grinding device 27 comprises a tool 257 in the end of an arm 256 applied to the upper cylindrical end of the column 211. The point of the tool 257 is exactly at the distance "R" from the axis $O_1O_2$. By manipulating the handle 24 the amplitude of the oscillations of the circular carriage 7 are adjusted while by acting on handwheel 29 the grinding element is advanced against the tool point as far as it is sufficient.

For finishing the shell body the tool holder 8 is used and also the work support when necessary. The tool holder with two tools 46, 47 is mounted on the seat 49 to turn in a horizontal plane in a suitable circular guide provided in an underlying carriage movable in the transverse direction by means of crank 44. After adjusting the turning seat according to the diameter of the connection cone between fore ring and shell body, the operator acting in crank 44 brings the point of tool 47 nearly in contact with the fore ring at the distance required from the base plane of the ogival head while tool 46 is cutting into the shell's body. Then by means of crank 48 the tool 75 holder 8 is displaced as many millimeters as required according to a metric scale provided between the seat 49 and said tool holder 8. After doing that the operator is sure that the two tools will turn the shell to the diameter wanted. By going then to the fore part of the machine the operator will adjust by means of levers 19 of Figure 2 the feed of main carriage 5. The machine will then function as an ordinary lathe and when the tool 46 of Fig. 25 reaches the conical base of the shell the tool 47 has reached the part already machined by the tool 46 towards the half of the cylindrical body. The discs 234, 233 of the apparatus illustrated in Figures 9 and 10 serve to facilitate the verification of the position of the end planes of the conical surface between the cylindrical surface of the fore ring and of the shell.

In finishing shells the following operations are performed:—

After tilting the arm 51 Figs. 2 and 3 to the position indicated by reference number 52 in Fig. 2 and mounting the shell on the work piece holder in the way above described, levers 21, 22 are observed to assure they are in the "loose" position. By acting on the handwheels 9 and levers 19 the speed of the work piece and of the main carriage feed are adjusted and with them the speed of grinding device 39 for finishing of the fore ring. The main motor is then set in operation and by acting on handwheel 12 the movement is transmitted to the spindle in the head stock 3 and consequently to the shell. Then the electric circuit of the grinding device is closed, the grinding element having been already moved to the point end of the shell as shown in Fig. 3 and by adjusting the handwheel 29 said element is caused to form a mark on the work. Thereafter the grinder is withdrawn slightly, by acting on the handwheel 29. Then by actuating the lever 22 the grinding device is turned until its rotation axis 149, 150 is nearly parallel to the axis of the shell. This being done the lever 22 is returned to its original position and by actuating the switches 71 and 61 the group 16 is moved towards the shell point until support 151 is engaged with the ogival point (Fig. 11). After removing the right hand stop 55, lever 21 is actuated in order to transmit to the main carriage 5 a rapid motion to the right until the grinding element of the device 39 is moved to the middle transverse plane of the shell fore ring (Fig. 11). Then the stops 55 (Fig. 2) are set according to the stroke limit desired. By adjusting the levers 19 the desired speed of reciprocation of the grinding device is effected and the latter is automatically moved in both directions.

By means of the graduated handwheel 36 the transverse feed motion is transmitted to grinding device 39 until the shell fore ring acquires a diameter of the value "D" according to the method above specified.

Thereafter the device 43 is tilted to the position shown in Figures 2 and 3; the bar 65 of group 16 is completely withdrawn; the magnetized disc 73 is arranged in its seat; the group 16 is moved back towards the shell; and the coordinate "a" of the axis, around which the grinder 27 is to oscillate (Figures 2 and 3) is fixed. The arm 51 is turned down to the position shown in full lines in Figures 2 and 3 and the value h of the ogival height is fixed as above described with or without alteration according to the value verified on diameter "D" of the fore ring. By means of the electric motor 60, the group 16 is returned again towards the right and the rest 186—187 is applied to the fore ring of the shell as shown in Figure 18. Then the positions of the stops 26 adjusted and by actuating the lever 22, the automatic oscillating motion is transmitted to the device 27.

As in the beginning of the finishing operation of the ogival surface the metal allowance is particularly localized towards the base of the ogival head, the operator may, at will, vary the stroke of the device 27 by actuating the lever 24. By adjusting the handwheel 29 a feed motion will be communicated to the grinding device until it may be verified that the ogival point has become needle shaped and the base plane of the ogival head coincides with the plane determined by the first disc on the right of the apparatus for the measurement of the height "h" as shown in the Figures 9 and 10.

After somewhat withdrawing the grinding device 27 and tilting the arm 51 of Fig. 2 to the position 52 its axis 149, 150 is arranged nearly parallel to the axis of the shell. If necessary the support 151 may be applied on the ogival head point and by acting on levers 18 the tool 47 is brought in proximity to the shell fore ring. Then the levers 19 are moved in position to impart to the carriage an ordinary feed movement, lever 21 being always left in the inactive position. After adjusting the levers 44 and 48 the operator proceeds with the operation of turning the conical surface between fore ring and shell body as above described.

The shell having been finished, the nut 106 is loosened. The arm 77 is arranged in the position shown in Fig. 2 and is advanced towards the head stock till the empty blade 78 has embraced the shell. The work piece holder 4 is then set in motion in the proper direction and as the shell bears on the blade it will not rotate and, therefore, the thread 107 is unscrewed from the shell. Thereafter, the group 16 is returned to the right, the arm 77 is rotated of 180°, the group 16 is moved again towards the head stock and the unfinished shell 86 applied to the holder 4 for repeating the foregoing operations.

I claim:

1. A machine for grinding and finishing shells comprising a rotatable work holding mandrel, a movable carriage, a rotatable grinding device adjustably mounted on said carriage for finishing the fore ring of the shell, a rotatable grinding device for finishing the ogival head of the shell, and a tool holder mounted on said carriage for movement therewith and adapted to coact with a shell mounted on said mandrel, the two grinding devices and said tool holder being independently adjustable.

2. An arrangement as claimed in claim 1 characterized in that the second mentioned grinding device is mounted for oscillatory movement about a fixed axis and the first mentioned grinding device is mounted for rectilinear movements.

3. An arrangement as claimed in claim 1 characterized in that said work holding mandrel includes a projecting member having threads thereon adapted to fit the threaded interior of the shell, a centering ring at the extremity of said projecting member adapted to engage the interior of the shell and center the latter in position, said ring being capable of being turned and trued on the machine.

4. An arrangement as claimed in claim 1 characterized in that said work holding mandrel includes a projecting member having threads thereon adapted to fit the threaded interior of the shell, a centering ring at the extremity of said projecting member adapted to engage the interior of the shell and center the latter in position, said ring being capable of being turned and trued on the machine, a second ring carried by the work holder adapted to engage the recess in the base of the shell.

5. An arrangement as claimed in claim 1 characterized in that said work holding mandrel includes a projecting member having threads thereon adapted to fit the threaded interior of the shell, a centering ring at the extremity of said projecting member adapted to engage the interior of the shell and center the latter in position, said ring being capable of being turned and trued on the machine, a second ring carried by the work holder adapted to engage the recess in the base of the shell, a check nut fitted on the holder and sliding on a third ring, the check nut terminating in a conical cavity corresponding with the taper of the shell base and adapted to fit and center the latter.

6. An arrangement as claimed in claim 1 characterized in that said work holding mandrel includes a projecting member having threads thereon adapted to fit the threaded interior of the shell, a centering ring at the extremity of said projecting member adapted to engage the interior of the shell and center the latter in position, said ring being capable of being turned and trued on the machine, a second ring carried by the work holder adapted to engage the recess in the base of the shell, a check nut fitted on the holder and sliding on a third ring, the check nut terminating in a conical cavity corresponding with the taper of the shell base and adapted to fit and center the latter, the check nut being threaded on the body of the tool holder and the thread thereof having a higher pitch than the internal thread of the shell to prevent unintentional removal of the latter from the work holder.

7. An arrangement as claimed in claim 1 characterized in that the second mentioned grinding device is mounted for movement about a fixed axis on the carriage by means of a supplemental carriage.

8. A machine as claimed in claim 1 characterized by the provision of a second carriage adjustable with relation to the first mentioned carriage and including an upper arm mounted for rotary movement and shell holding members at the ends of the arm movable into positions to dispose the shells supported therein in substantial axial alinement with the work holder.

9. A machine as claimed in claim 1 characterized by the provision of a second carriage adjustable with relation to the first mentioned carriage and including an upper arm mounted for rotary movement and shell holding members at the ends of the arm movable into positions to dispose the shells supported therein in substantial axial alinement with the work holder, a body member adjustable with the second mentioned carriage and supporting the upper arm, said body member being disposed in axial alinement with the work holder and a member engageable in the body member to assist in supporting the shell during finishing.

10. A machine as claimed in claim 1 characterized by the provision of a second carriage adjustable with relation to the first mentioned carriage and including an upper arm mounted for rotary movement and shell holding members at the ends of the arm movable into positions to dispose the shells supported therein in substantial axial alinement with the work holder, a body member on the second mentioned carriage pivotally supporting the arm and disposed in axial alinement with the work holder, and a gage plate at the other end of the body member adapted to engage the point of the shell.

11. A machine as claimed in claim 1 characterized by the provision of a second carriage adjustable with relation to the first mentioned carriage and including an upper arm mounted for rotary movement and shell holding members at the ends of the arm movable into positions to dispose the shells supported therein in substantial axial alinement with the work holder, and hand and power operated means for adjusting the second mentioned carriage.

12. An arrangement as claimed in claim 1 characterized in that the second mentioned grinding device is mounted for pivotal movement about a fixed point on the carriage, an indicating rod carried by the first mentioned grinding device and a gage coacting with said rod for indicating the position of said grinding device.

13. An arrangement as claimed in claim 1 characterized by the provision of manually operable means for adjusting the first mentioned grinding device, a speed reducing gear, an indicating device associated with said adjusting means.

14. An arrangement as claimed in claim 1 characterized by the provision of a diameter measuring device adjustably mounted directly on the first mentioned grinding device and capable of being applied to the work during the operation of said grinding device.

15. An arrangement as claimed in claim 1 characterized by the provision of a rest removably supported in said carriage for assisting in supporting the shell during the finishing operations thereon.

16. An arrangement as claimed in claim 1 characterized by the provision of a pivot member positioned in the carriage and forming a pivotal mount for the second mentioned grinding device, and a holding device adapted to be inserted in place of the pivot member to partially support the shell during finishing operations, said holding device including a separately adjustable member engageable with the shell.

17. An arrangement as claimed in claim 1 characterized in that the second mentioned grinding device is mounted for pivotal movement about a fixed axis, an indicating member adapted to be applied to the axis of the second mentioned grinding device and having a part extending parallel to the axis of the shell and terminating in the plane of the point of the shell, and a cooperating member adjustably mounted and having surfaces adapted to cooperate with the end of said part and with the point of the shell.

18. An arrangement as claimed in claim 1 characterized by the provision of means pivotally mounting the second mentioned grinding device for pivotal movement on the carriage, a member adjustable to the pivotal action of the second mentioned grinding device, a truing device for the grinding element of the second mentioned grinding device carried by said member, said truing device lying in the horizontal plane of the axis of the shell.

19. An arrangement as claimed in claim 1, characterized by the provision of a support adjustably secured to a stationary part of the machine and movable into proximity to a shell mounted on said holder, a shaft of predetermined length mounted on said support, positioning means coacting with the terminal of the shaft, and a plurality of shell engaging members rotatable on the shaft.

20. An arrangement as claimed in claim 1 characterized by the provision of a support adjustably secured to a stationary part of the machine and movable into proximity to a shell mounted on said holder, a shaft of predetermined length mounted on said support, positioning means coacting with the terminal of the shaft, a plurality of shell engaging members rotatable on the shaft, and means for adjusting the shaft relatively to the support.

VINCENZO FLAGIELLO.